(12) United States Patent
Amundsen

(10) Patent No.: US 6,621,677 B1
(45) Date of Patent: Sep. 16, 2003

(54) METHOD AND SYSTEM FOR SERIES FAULT PROTECTION

(75) Inventor: Aage Amundsen, Heimdal (NO)

(73) Assignee: Sicom AS, Trondheim (NO)

( * ) Notice: Subject to any disclaimer, the term of this patent is extended or adjusted under 35 U.S.C. 154(b) by 0 days.

(21) Appl. No.: 09/581,943

(22) PCT Filed: Dec. 21, 1998

(86) PCT No.: PCT/NO98/00388

§ 371 (c)(1),
(2), (4) Date: Sep. 13, 2000

(87) PCT Pub. No.: WO99/33155

PCT Pub. Date: Jul. 1, 1999

(30) Foreign Application Priority Data

Dec. 22, 1997 (NO) .......................... 19976052

(51) Int. Cl.7 .................................. H02H 5/04
(52) U.S. Cl. ................ 361/103; 361/104; 361/58
(58) Field of Search ................. 361/103, 104, 361/58, 124

(56) References Cited

U.S. PATENT DOCUMENTS

| | | | | |
|---|---|---|---|---|
| 3,872,355 A | * | 3/1975 | Klein et al. ............ | 317/18 D |
| 4,748,388 A | * | 5/1988 | Muller .................. | 318/254 |
| 4,763,365 A | * | 8/1988 | Gerondale et al. | |
| 4,858,054 A | * | 8/1989 | Franklin ................ | 361/57 |
| 5,193,044 A | * | 3/1993 | Czerwiec .............. | 361/104 |
| 5,627,719 A | | 5/1997 | Gaston | |
| 5,805,399 A | * | 9/1998 | Pacholok ............. | 361/57 |
| 5,844,761 A | * | 12/1998 | Place .................... | 361/104 |

FOREIGN PATENT DOCUMENTS

| | | | |
|---|---|---|---|
| DE | 32 29 020 | 2/1984 | |
| DK | 0293/93 | 12/1994 | |
| GB | 2 156 154 | 10/1985 | |
| GB | 2156154 A | * 10/1985 | .......... H01H/37/76 |

* cited by examiner

Primary Examiner—Gregory J. Toatley, Jr.
Assistant Examiner—Z Kitov
(74) Attorney, Agent, or Firm—Finnegan, Henderson, Farabow, Garrett & Dunner, L.L.P.

(57) ABSTRACT

A method for protection of an electrical installation against series fault. The method is directed to detection of heat development at specific points in the installation by means of individual sensor/switch units connected to the installation and interruption of the current supply to the installation when the heat development exceeds a given threshold. The invention also concerns a system for implementing the method.

10 Claims, 2 Drawing Sheets

METHOD AND SYSTEM FOR SERIES FAULT PROTECTION

The invention concerns a method and a system for protection of an electrical installation against series fault.

Series fault arises in a loaded electric circuit when a deficient contact/connection occurs. This deficient contact/connection may be caused by poorly secured terminals, oxide coating on the conductors, conductors which have loosened slightly due to mechanical strain, etc. Series fault often occurs in sockets and plugs.

The consequence of series fault is an increase in the electrical resistance and thus also the power at the fault location, the power P.being expressed by:

$$P = RI^2$$

where R is the electrical resistance at the fault location, and I is the current intensity.

As a rule the resistance at the fault location is low compared to the load resistance in the circuit. As a result the system behaves like a current generator, i.e. the current through the fault location is constant even though the transition resistance increases. The power development as mentioned above will therefore increase proportionally with the transition resistance. The power causes the fault location to heat up.

Series fault can also lead to the formation of an electric arc at the fault location. Due to the current generator behaviour the heating of the fault location, and possibly the formation of the electric arc will continue as long as the fault location is supplied with current. Thus there is a high risk of fire when a series fault occurs. The situation is particularly critical in countries where buildings are normally of wood, such as in Norway amongst other places. Since wood is easily ignited the fire risk will increase.

Series fault is difficult to detect. Due to the current generator behaviour the fault will not lead to current increase. Nor will the fault be perceived by the system as an earth fault. Thus conventional protection means will not react to series fault.

Attempts have been made to develop an electronic series arc protection in order to detect interference in specific signals when an electric arc occurs. This has proved to be very difficult, since the equipment is unable to distinguish between interference caused by electric arcs and other "non-fault" phenomena, such as sparks from brush motors (vacuum cleaners, hair dryers, etc.). Moreover, the equipment is assumed to be highly expensive, and it is therefore not easy to make it's use obligatory.

U.S. Pat. No. 4,858,054 discloses circuits for protection of an electrical installation, mainly against arc short circuits. Whereas an arc short circuit result in a higher current than the normal load current, a series fault will not result in such a current increase. However, in specific embodiments, the publication discloses additional means for protecting against overheating at specific points, particularly connection points subject to the buildup of aluminium oxide. Said means comprise thermostats or thermistors mounted to terminal connections that may be possible situses of overheating. The detection of heat development exceeding a given threshold effects the introduction of an additional current drawn from the supply through a "dump circuit", comprising triacs and current limiting resistors, to the return phase conductor. The resulting increase in overall current activates a circuit breaker, which instantaneously interrupts the current from the supply. The publication does not indicate the introduction of an intentional current to earth, nor does it indicate the utilization of an earth leakage circuit breaker arranged between the supply and the installation.

In GB-A-2.156.154 there is disclosed a fire alarm system consisting of temperature sensors which are arranged at various locations in a house. The sensors are connected by means of a low voltage system. Each sensor consists of a closed receptacle containing an open contact, and when a specific temperature threshold is exceeded the contact will close, activating an alarm. The system will issue a warning that a fire has started, which can be regarded as a first step in protection, but it will not, however, remove the cause of the fire automatically on detection, and is therefore not satisfactory with regard to safety. The system includes a separate low voltage system, which entails installation and maintenance costs, and which has to be checked regularly to ensure that it will work when needed. It will only be possible to change the system by changing the low voltage system, and this is a very cumbersome process. For these reasons the safety and cost-efficiency when using this known system cannot be considered to be satisfactory.

U.S. Pat. No. 5,627,719 discloses a system for protection of an electrical installation against faults which result in a temperature increase in parts of the system, but which are not sufficient to trigger the safety devices. A sensor line which runs parallel to the current supply cables is connected to different devices in the installation. The sensor line consists of a wire of a material which melts at high temperature, where one end of the wire is connected to earth and the other end is connected to a control circuit which opens the closest switch when a fault is detected. The sensor line and the switch which is opened are connected via a control circuit. The system succeeds in stopping the current supply to the fault location when a fault is detected. However, since the system is continuous and requires a separate line installed along the installation, it will have many of the same disadvantages as the system referred to in GB-A-2.156.154, i.e. high installation and maintenance costs and lack of flexibility. In addition to this it will be impossible to determine accurately at which points in the installation the detection should take place, e.g. where sockets and plugs are located, since the risk of series fault is greatest at these points. This system therefore does not provide a satisfactory protection.

The object of the invention is to solve these problems in a reliable, simple and cost-effective manner.

The invention concerns a method for protection of an electrical installation against series fault, comprising the detection of heat development at specific points in the installation by means of individual sensor/switch units connected to the protected installation and the interruption of the current supply to the installation when the heat development exceeds a given threshold.

The invention also concerns a system for protection of an electrical installation against series fault. The system comprises individual sensor/switch units with heat development sensors arranged at specific protection points in the installation and connected thereto, and a switch arranged between the installation and its current supply, together with control means between the heat development sensors and the switch, with the result that when a specific threshold for heat development detected by the heat development sensors is exceeded, this leads to the opening of the switch.

The principle behind the invention is that there is only a limited number of locations in a building where the series electric arc can arise, and therefore it is sufficient to provide sensor/switch units in these locations. The potential fault points are located at contact connections in wall/roof boxes, screw terminals, plug connections and particularly in plugs/sockets.

The system according to the invention therefore consists of individual units which are connected to the current supply network.

At the locations concerned there are installed sensors which register heat development and which set a heat development limit lying well below dangerous ignition temperatures, but with a good margin over a temperature which may occur during normal operation. For use with 230V network in houses, a heat development threshold may be selected corresponding to a temperature of around 60° C. to 70° C.

Unlike the known systems, no special network is required for connecting the sensors. A cheap and highly flexible solution is thereby provided, since when extending the installation it will be sufficient to connect sensor/switch units at the new points to obtain protection thereof.

In an embodiment of the method according to the invention the fault point concerned will be connected to earth on detection of heat development which exceeds the threshold. This will result in an earth fault and interruption of the current supply to the installation will be effected by means of an earth leakage circuit breaker arranged between the installation and the connected current supply.

For this purpose the sensor/switch unit's control means comprises at least one normally open contact provided between each protection point and earth and a control connection between the heat development sensor and the contact, with the result that when a specific threshold for heat development is exceeded, the contact will be closed, resulting in an earth fault, and the earth leakage circuit breaker will be opened.

In this preferred embodiment of the invention the sensor unit will create an earth connection via a resistor of approximately 3 kΩ which will give a fault current to earth of over 30 mA. This current value will cause an earth leakage circuit breaker at the current supply to be disconnected.

The resistor should be of the type which burns off in a controlled manner in the event of continuous overload. Thus the earth fault will cease after a certain period of time. The idea of this arrangement is to provide further safety in the system if it is installed in an installation without an earth leakage circuit breaker. In such an installation where the current supply is not automatically interrupted when an earth fault is detected, the current to earth can lead to heat development in the earthing resistor and thereby to the risk of fire. As mentioned above, this problem is avoided by using a resistor which burns off in a controlled manner after a certain time.

The disconnection of the current supply will take place independently of where in the building the fault occurs. When a fault has occurred, it will be searched for in the same way as for an earth fault, the part causing the heat development will be replaced and the sensor/switch unit will be replaced by a new one.

In a further preferred embodiment the sensor/switch unit consists of a transparent container with a helical spring which forms the normally open contact and one end of which is in contact with the protection point and the other end presses against an insulating fusible body which forms the heat development sensor, with the result that when a specific threshold for heat development is exceeded the fusible body will melt and the contact will be closed. The transparent container permits easy inspection of the unit.

The dimensions of the finished product according to this embodiment of the invention are approximately 3 mm pipe diameter and approximately 30 mm length.

In current supply networks where the network's neutral point is insulated (IT network), as is the case in the Norwegian supply network, a continuous earth fault may occur on one phase. The earth fault phase will thus have very low voltage, while the other phases in compensation receive full phase voltage to earth.

If the sensor/switch unit is connected between earth and a phase which is close to earth potential, the sensor will pass a very low current to earth when activated. The unit's reliability is reduced, since it is uncertain whether the protecting device (the earth leakage circuit breaker) will be triggered.

In this case the sensor/switch unit will be connected between earth and two phases by means of a connection circuit (diodes and safety resistors), and not between earth and one phase as in the previously mentioned embodiments. This will ensure that, even though there is a standing earth fault on the network in one phase, current will still pass in the other phase when the switch is closed, and the earth leakage circuit breaker will be triggered.

In current supply networks where the neutral point is earthed, there will always be voltage between one phase and earth. In this case the invention can be employed in its simplest embodiment, i.e. without a connection circuit for connecting two phases to the sensor.

The invention provides a cheap, simple and reliable protection. It is a "once-only protection", which can easily be replaced when it has been activated.

The units are independent of one another, they are supplied with current by means of the phase conductors. This has the advantage that the installation and maintenance costs for the whole system are substantially reduced.

Detection of the heat development leads to rapid and safe action: stopping of the current supply.

It is also a simple matter to zero the system after the activated unit has been removed.

The invention will now be described in more detail by means of the accompanying drawings, in which.

Figure 1:
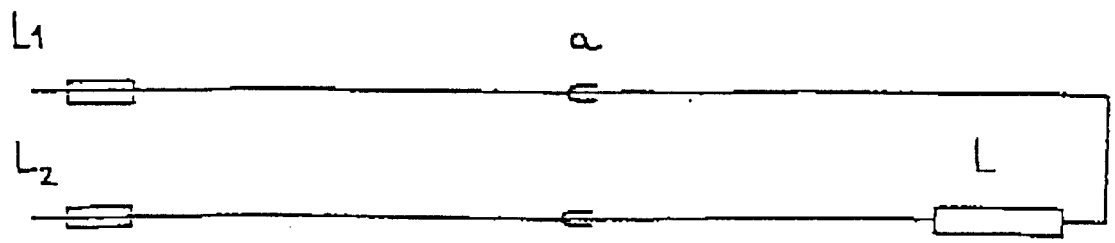
FIG. 1 illustrates a circuit in which a series fault arises.

FIG. 1 illustrates a circuit in which a series fault arises. The circuit consists of two phase conductors L1 and L2, both of which in a normal current supply network will have a voltage to earth. The circuit supplies a load L. At a point a in one phase conductor a series fault arises, with a transition resistance which is low in relation to the load. The system acts like a current generator and the current does not decrease even though the transition resistance (and the associated heat development) increases.

Figure 2:
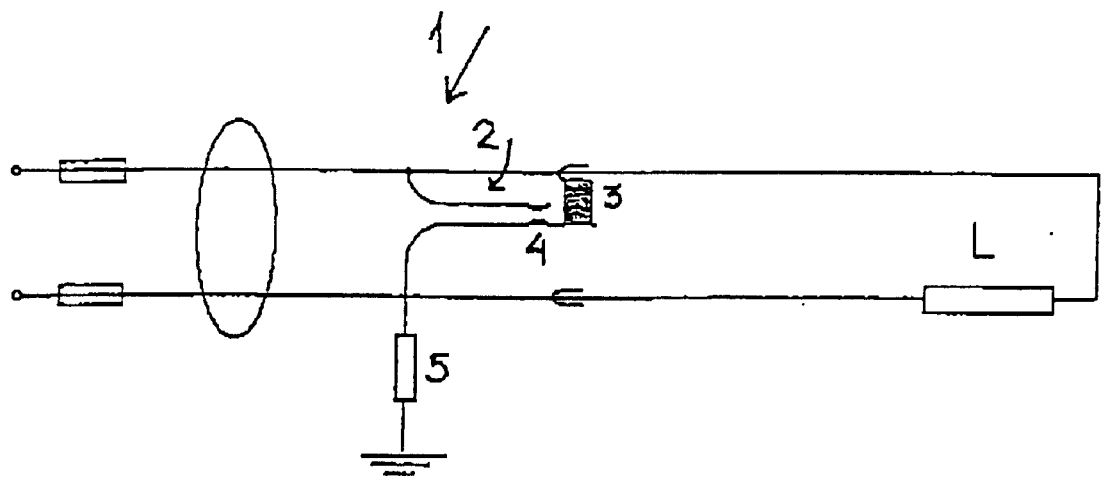
FIG. 2 is a principle drawing of the invention.

FIG. 2 is a principle drawing of the invention. The system according to the invention consists of individual units 1 with two contacts, one to the protection point (reference numeral 2) and one to earth (reference numeral 4). The contact to earth is effected through a resistor 5. A heat development sensor 3 is arranged between the contacts' free ends. If heat develops over a specific threshold the sensor will melt or alter its state in another way, causing the contacts' free ends to be joined together. This will lead to earthing of the protection point and the installation's earth leakage circuit breaker (not shown) will be triggered. The energy supply to the fault location is thereby interrupted.

Figure 3:
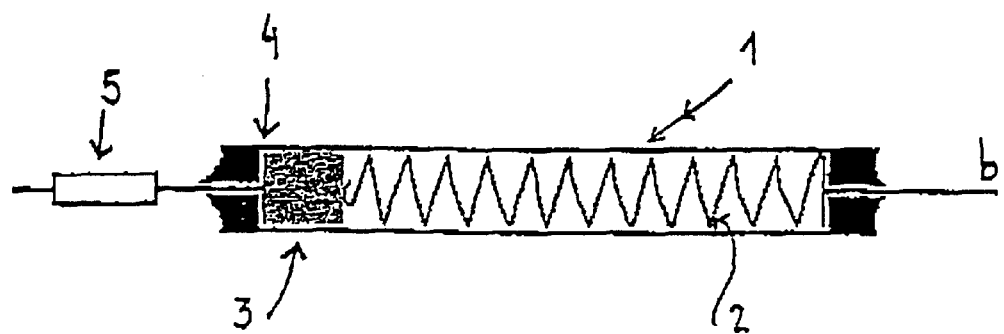
FIG. 3 illustrates an embodiment of the sensor/switch unit.

FIG. 3 illustrates an embodiment of the sensor/switch unit. The unit 1 consists of a container which is insulating and preferably transparent with a helical spring 2, one end of which is in contact with the protection point b and the other end of which presses against an insulating fusible body 3, which forms a part of the heat development sensor. At the end which is not in contact with the helical spring the fusible body 3 abuts against a contact plate 4 in conducting contact with the earth conductor through a resistor 5.

In the event of heat development the fusible body 3 will melt, the contact consisting of the helical spring 2 and the contact plate 4 will be closed, and the protection point b will come into contact with earth through the resistor 5. The installation's earth leakage circuit breaker (not shown) will be triggered and the current supply to the installation will be interrupted.

If the current supply network is of the IT type, with insulated neutral conductor, it will be necessary to employ a connection circuit between the phase conductors and the sensor/switch unit.

Figure 4:
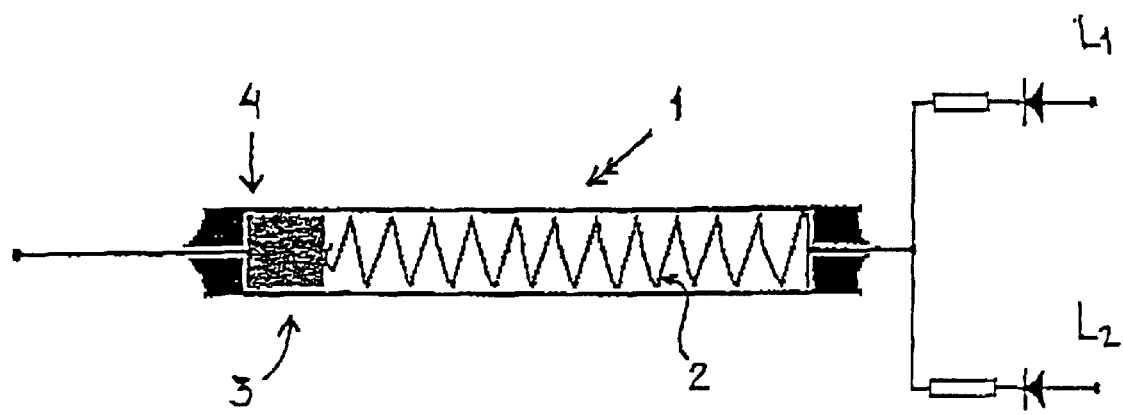
FIG. 4 illustrates the connection circuit for use of the sensor in an IT network.

This is illustrated in FIG. 4. The figure shows the same switch/sensor unit illustrated in FIG. 2, but in this case one end of the helical spring 2 is connected to two phase conductors L1 and L2, through diodes and safety resistors. The object of this is to make it possible to detect series faults even though one of the phases has a continuous earth fault and consequently low voltage.

As can be seen from the above description, the method and the system according to the invention will provide a cheap and reliable protection.

The system employs the existing installation and has few loose parts. The units are inexpensive to produce.

Even though the invention has been described in connection with use in a house, it can be used in other environments, and with other voltage levels.

The design of the sensor/switch unit will vary with the different applications.

What is claimed is:

1. A method for protection of an electrical installation against a series fault, comprising:
   detecting heat development caused by a series fault at a point in the electrical installation with a sensor coupled to the installation;
   coupling at least one phase line of the electrical installation to ground upon a predetermined threshold value of heat development being reached, thereby causing a ground fault condition; and
   interrupting the current supply to the electrical installation with a ground leakage circuit breaker coupled to the electrical installation and the current supply sensing said ground fault condition.

2. A method according to claim 1, wherein:
   said electrical installation comprises an insulated neutral conductor; and further including the step of connecting at least two phase lines of the electrical installation to ground upon said predetermined threshold valve being reached, thereby causing a ground fault condition sensed by said ground leakage circuit breaker even if one of the phase lines has a continuous ground fault, whereby said circuit breaker interrupts the current supply to the electrical installation.

3. A system for protection of an electrical installation from a series fault, comprising:
   a heat development sensor provided at a point in the electrical installation to be protected;
   switch means comprising ground leakage-type circuit breaker responsive to a ground fault condition coupled between a source of current and the electrical installation; and
   control means comprising a normally open contact coupled to at least one phase line of the electrical installation and to ground at said point and a control connection coupled to said sensor and said contact;
   control means being responsive to a predetermined threshold of heat development caused by a series fault, so that, upon said threshold being reached, said contact is closed, allowing current to flow through the contact to ground, resulting in a ground fault condition thereby opening said circuit breaker.

4. A system according to claim 3, further comprising:
   connection circuit means for connecting said switch means between two phase lines of the electrical installation and ground.

5. A system according to claim 4, wherein said switch means comprises a transparent container provided with a helical spring forming a normally-open contact;
   a first end of said switch means being coupled to the point to be protected and a second end being urged against an insulating fusible body forming part of said heat development sensor;
   whereby said fusible body melts upon said threshold being reached thereby causing said normally-open contact to close.

6. A system according to claim 5, further comprising:
   a resistor connected between said normally-open contact and ground.

7. A system according to claim 6, wherein:
   the value of said resistor is approximately 3 KΩ.

8. A system according to claim 7, wherein said resistor undergoes a controlled burn when subjected to a continuous overload condition.

9. A system according to claim 5, wherein:
   said container is approximately 30 mm in length and has a diameter of approximately 3 mm.

10. A system for protection of an electrical installation from a series fault comprising:
    switch means comprising a ground leakage-type circuit breaker coupled between a source of current and the electrical installation;
    said switch means further comprising:
    a first contact coupled to a protection point of the electrical installation;
    a second contact coupled to ground, optionally through a resistor;
    a heat development sensor coupled to said first and second contacts and being responsive to heat development caused by a series fault exceeding a threshold value to cause said contacts to become connected, thereby grounding the protection point,
    whereby said circuit breaker causes interruption of the source of current to the electrical installation.

* * * * *